US010054490B2

(12) United States Patent
Yildizyan et al.

(10) Patent No.: US 10,054,490 B2
(45) Date of Patent: Aug. 21, 2018

(54) MEDICAL THERMOMETER HAVING AN IMPROVED OPTICS SYSTEM

(71) Applicant: Helen of Troy Limited, Belleville, St. Michael (BB)

(72) Inventors: Aleksan Yildizyan, Waltham, MA (US); James Christopher Gorsich, Los Angeles, CA (US)

(73) Assignee: Helen of Troy Limited, St. Michael (BB)

( * ) Notice: Subject to any disclaimer, the term of this patent is extended or adjusted under 35 U.S.C. 154(b) by 0 days.

(21) Appl. No.: 15/869,259

(22) Filed: Jan. 12, 2018

(65) Prior Publication Data

US 2018/0136046 A1    May 17, 2018

Related U.S. Application Data

(63) Continuation of application No. 15/642,438, filed on Jul. 6, 2017, which is a continuation of application No. 14/082,321, filed on Nov. 18, 2013.

(60) Provisional application No. 61/728,003, filed on Nov. 19, 2012.

(51) Int. Cl.
*G01J 5/08*    (2006.01)
*G01J 5/00*    (2006.01)
*G01J 5/06*    (2006.01)

(52) U.S. Cl.
CPC .......... *G01J 5/0806* (2013.01); *G01J 5/0011* (2013.01); *G01J 5/0809* (2013.01); *G01J 5/0831* (2013.01); *G01J 2005/065* (2013.01)

(58) Field of Classification Search
CPC ...... G01J 5/0866; G01J 5/0011; G01J 5/0809; G01J 5/0831; G01J 2005/065

USPC ................................................ 374/130, 121
See application file for complete search history.

(56) References Cited

U.S. PATENT DOCUMENTS

| 5,017,018 | A * | 5/1991 | Iuchi | G01J 5/02 250/346 |
| 2011/0228811 | A1 * | 9/2011 | Fraden | G01J 5/061 374/130 |
| 2013/0259087 | A1 * | 10/2013 | Gerlitz | G01J 5/0265 374/130 |

FOREIGN PATENT DOCUMENTS

| CN | 1470854 | 1/2004 |
| CN | 201225925 | 4/2009 |
| CN | 102265125 | 11/2011 |
| JP | 61-144440 | 12/1984 |
| JP | 04-128684 | 4/1992 |
| JP | 05-072043 | 3/1993 |
| JP | H05506628 | 9/1993 |
| JP | H0816629 | 1/1996 |
| JP | 08-275925 | 10/1996 |
| JP | H11188008 | 7/1999 |
| JP | 2000-217791 | 8/2000 |
| JP | 2001-050818 | 2/2001 |
| JP | 2002 333370 | 11/2002 |

(Continued)

*Primary Examiner* — Lisa Caputo
*Assistant Examiner* — Nathaniel T Woodward
(74) *Attorney, Agent, or Firm* — Rankin, Hill & Clark, LLP

(57) ABSTRACT

A medical thermometer including a curved mirror and a radiation sensor is disclosed. The radiation sensor is disposed relative to the mirror in a configuration whereby the mirror reflects away from the sensor radiation that passes through the radiation entrance and that is oriented outside a range of angles relative to the mirror, and reflects toward the sensor radiation that passes through the radiation entrance and that is oriented within a range of angles relative to the mirror.

28 Claims, 7 Drawing Sheets

(56) References Cited

FOREIGN PATENT DOCUMENTS

| JP | 2012-507007 | 3/2012 |
|----|-------------|--------|
| WO | 91/15739 | 10/1991 |
| WO | 2010/048505 | 4/2010 |

* cited by examiner

MEDICAL THERMOMETER HAVING AN IMPROVED OPTICS SYSTEM

CROSS-REFERENCES TO RELATED APPLICATIONS

This application claims priority to U.S. provisional application No. 61/728,003, filed Nov. 19, 2012, the disclosure of which is incorporated herein by reference in its entirety.

FIELD OF THE INVENTION

The present invention relate generally to devices for measuring temperature, and more specifically to non-contact infrared thermometers for medical applications incorporating mirrors to reduce the effects of stray radiation.

DESCRIPTION OF RELATED ART

A thermal radiation or infrared (IR) thermometer is a device capable of measuring temperature without physically contacting the object of measurement. Thus, such thermometers are often called "non-contact" or "remote" thermometers. In an IR thermometer, the temperature of an object is taken by detecting an intensity of the IR radiation that is naturally emanated from the object's surface. For objects between about 0° C. and 100° C., this requires the use of IR sensors for detecting radiation having wavelengths from approximately 3 to 40 micrometers. Typically, IR radiation in this range is referred to as thermal radiation.

One example of an IR thermometer is an "instant ear" medical thermometer, which is capable of making non-contact temperature measurements of the tympanic membrane and surrounding tissues of the ear canal of a human or animal. Instant ear thermometers are exemplified by U.S. Pat. No. 4,797,840 to Fraden, which is incorporated by reference herein in its entirety. Other examples include medical thermometers for measuring surface skin temperatures (for example, a skin surface temperature of the forehead) as exemplified by U.S. Pat. No. 6,789,936 to Kraus et al., which is incorporated by reference herein in its entirety.

In order to measure the surface temperature of an object based on its IR radiation emissions, the IR radiation is detected and converted into an electrical signal suitable for processing by conventional electronic circuits. The task of detecting the IR radiation is accomplished by an IR sensor or detector.

Conventional thermal IR sensors typically include a housing with an infrared transparent window, or filter, and at least one sensing element that is responsive to a thermal radiation energy flux $\Phi$ emanating from an object's surface that passes through the IR window of the IR sensor and onto the sensing element. The IR sensor functions to generate an electric signal, which is representative of the net IR flux $\Phi$ existing between the sensing element and the object of measurement. The electrical signal can be related to the object's temperature by appropriate data processing, as is known in the art.

Thermal flux $\Phi$ is a function of two temperatures: a sensing element surface temperature $T_s$ and a surface temperature of the object $T_b$ (measured in Kelvin). Theoretically, Planck's law describes the amount of electromagnetic energy radiated with a certain wavelength radiated by a black body in thermal equilibrium. For a broad optical spectral range, which may be determined by an optical system of the IR thermometer, the relationship between the two temperatures $T_s$, $T_b$ and the flux $\Phi$ may be approximated by a fourth-order parabola. This approximation is known as the Stefan-Boltzmann law:

$$\Phi = \kappa \varepsilon_b \varepsilon_s \sigma (T_b^4 - T_s^4) \tag{1}$$

where $\varepsilon_b$ and $\varepsilon_s$ are the surface emissivities of the object and sensing element, respectively, $\sigma$ is the Stefan-Boltzmann constant, and $\kappa$ is an optical constant which may be determined by measurement during calibration of the IR thermometer.

For a relatively small difference between the object's true temperature $T_b$ and sensor's temperature $T_s$, Eq. (1) can be approximated as:

$$\Phi \approx 4\kappa \varepsilon_b \varepsilon_s \sigma T_s^3 (T_b - T_s) \tag{2}$$

An objective of the IR thermometer is to determine the surface temperature of the object, $T_b$, which may be calculated as $T_{bc}$ from inverted Eq. 2:

$$T_{bc} = T_s + \frac{\Phi}{4\kappa \varepsilon_b \varepsilon_s \sigma T_s^3} \tag{3}$$

Ideally, the computed temperature $T_{bc}$ should be equal to the true temperature $T_b$. Practically, these temperatures may differ as the result of, e.g., measurement error or calibration drift. It can be seen from Equation (3) that, in order to calculate temperature $T_{bc}$, two values need to be determined: the magnitude of the IR flux $\Phi$ and the IR sensing element's surface temperature $T_s$. The accuracy of the temperature computation depends on the measurement accuracy for all variables on the right side of Eq. (3). The first summand $T_s$ can be measured quite accurately by a number of techniques known in the art, for example, by employing a thermistor or RTD temperature sensor. The second summand can be more problematic, especially due to a generally unknown and unpredictable value of the object's emissivity $\varepsilon_b$. For example, in medical thermometry, the emissivity $\varepsilon_b$ is a skin emissivity that is defined by the skin properties and shape. The skin emissivity may, for example, range from 0.93 to 0.99.

To determine how emissivity affects accuracy, a partial derivative of Eq. (2) may be calculated as:

$$\frac{\partial \Phi}{\partial \varepsilon_b} = 4\kappa \varepsilon_s \sigma T_s^3 (T_b - T_s) \tag{4}$$

The partial derivative represents the measurement error due to an unknown emissivity $\varepsilon_b$ of an object. Eq. (4) shows that the error approaches zero as $T_s$ approaches $T_b$. Accordingly, when $T_b$ approximately equals $T_s$, the error is small. Thus, to minimize errors, it is desirable to keep the temperature $T_s$ of the IR sensor as close as is practical to the object's temperature $T_b$. For an instant ear thermometer, for example, U.S. Pat. No. 5,645,349 to Fraden, incorporated by reference in its entirety herein, teaches a heated sensing element for bringing the temperatures $T_s$ and $T_b$ into proximity of each other. U.S. Pat. No. 7,014,358 to Kraus et al., incorporated by reference in its entirety herein, alternatively teaches a heating element for warming the IR sensor housing. Additionally, U.S. Patent Application Publication No. U.S. 2011/0228811 to Fraden, incorporated by reference in its entirety herein, teaches shielding the sensor from stray radiation using a shield that is also heated to temperature $T_b$.

When temperature is measured from a surface, it is important to minimize the amount of radiation received at the IR sensor that emanated from unwanted sources. One way to minimize the chance of picking up unwanted or stray radiation is to narrow the optical field of view of the IR thermometer. One method is to use IR lenses to narrow the optical field of view as exemplified by U.S. Pat. No. 5,172,978 to Nomura et al. (radiant thermometer including a lens barrel mounting a condensing lens at one end and an IR detector at the other end) and U.S. Pat. No. 5,655,838 to Ridley et al. (radiation thermometer with multi-element focusing lens, eye piece, beam splitter and IR detector), each of which is incorporated by reference in its entirety herein.

Another method for minimizing the chance of picking up flux from stray objects employs mirrors to aid a user of an IR thermometer in visualizing the IR thermometer's field of view. This approach is exemplified by U.S. Pat. No. 4,494,881 to Everest, which is incorporated by reference in its entirety herein.

While these methods are capable of removing from the sensor's field of view some of the sources of undesired radiation, it would be of additional benefit to remove sources of radiation that are within the IR sensor's field of view, but that emanate from outside of a desired target area within that field of view.

SUMMARY OF THE INVENTION

A non-contact IR thermometer according to various embodiments of the present invention includes, among other things, an IR radiation sensor having a sensor surface, which may be coupled to a filter positioned in the sensor's field of view that may be capable of passing only radiation having a desired range of wavelengths; a mirror, which may be parabolic or approximately parabolic in shape and may include surfaces and curvatures based on elliptic paraboloids, the sensor being positioned at or near a focal point of the mirror and the filter being positioned between the sensor and the mirror; and an aperture that is outside the sensor's direct field of view, the mirror providing a radiation path between the filter and the aperture. In various embodiments, the sensor may be included as a component on a semiconductor device that possesses various additional functionalities as will be understood by those having ordinary skill in the art. Additionally, in various embodiments, the center of the sensor surface may be positioned at or near the focal point of the mirror and the surface of the sensor may be oriented at various angles with respect to the baseline of the mirror to further minimize the amount of stray radiation reaching the sensor, which may be determined or understood as a percentage of total radiation. In various embodiments, the angle between the baseline of the mirror and the normal to the surface of the mirror is between approximately 25° and 35°. In other embodiments, this angle is approximately 31.5°. In various embodiments the aperture may include, be covered by, or have disposed adjacent thereto a protective window and/or filter that can prevent radiation of certain undesired wavelengths from passing therethrough.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

A remote IR thermometer is disclosed that includes, among other things, a parabolic or approximately parabolic mirror and an IR radiation sensor assembly including a filter component and a sensor component. The sensor component includes a surface with a geometric center point on the surface that is positioned in the vicinity of the mirror's focal point. The sensor component may be oriented about the center point at various angles. For the purpose of illustrating principles in accordance with various embodiments of the present invention, several non-limiting examples of the various embodiments are described below. Accordingly, the scope of the invention should be understood to be defined only by the scope of the claims and their equivalents, and not limited by the example embodiments.

Figure 1:
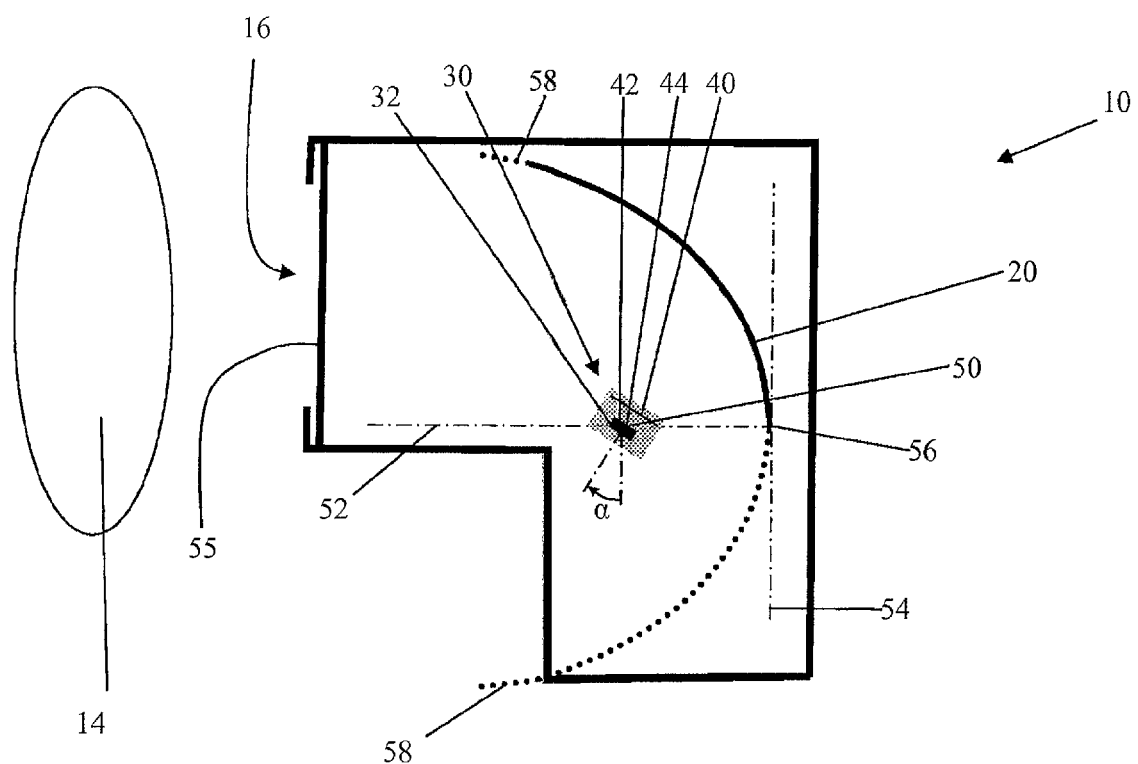
FIG. 1 is a cross-sectional view of an IR thermometer according to an embodiment of the present invention.

FIG. 1 shows a schematic, cross-sectional view of an embodiment of the mirror 20 and sensor assembly 30 inside a remote IR thermometer 10 having a radiation entrance, e.g., aperture 16 that may include, be covered by, or have disposed adjacent thereto a protective window and/or filter 55. Mirror 20 may be parabolic or approximately parabolic in shape so as to define a focal point 50 near to or along the axis of symmetry 52, as defined by the mirror's parabolic or approximately parabolic curvature 58, which is perpendicular to the mirror's baseline 54, the baseline being a line tangent to the mirror at the base or vertex of the mirror (or the parabolic or approximately parabolic shape thereof). The general equation for a parabola is $y=ax^2+bx+c$, where a and b are constants that define the shape of the parabola and c is a constant that defines the position of the parabola's vertex with respect to an origin. In various embodiments, a may be approximately between, e.g., 0.01 and 2.0, or approximately between 0.07 and 0.09, and more particularly, approximately 0.5, 0.08, or 0.0799. In various embodiments b may be approximately between, e.g., −2.0 and 2.0, or approximately between −0.02 and −0.01, and more particularly approximately 1.0, −0.02, or −0.015. Because the definition of c is relative to an origin, and because c does not affect the shape of the parabola, a person having ordinary skill in the art will appreciate that c does not need to be defined to carry out the various embodiments of the invention disclosed herein. In various embodiments, a and b are chosen such that the corresponding focal point may be located on the axis of symmetry, at various positions above the corresponding vertex. In various embodiments, axis of symmetry 52 is nominally perpendicular to aperture 16. In various embodiments, axis of symmetry 52 may pass through a lower portion of aperture 16. In other embodiments, axis of symmetry 52 may pass below aperture 16. In various embodiments, the mirror surface is defined by sweeping or rotating any of the parabolas heretofore described about the axis of symmetry 52. In other embodiments the mirror may also include curvatures and surfaces that may be described by the equation for an elliptic paraboloid, i.e., $$\frac{z}{g} = \frac{x^2}{d^2} + \frac{y^2}{f^2},$$

where d and f are constants that dictate the degree of curvature in the x/z and the y/z planes, and g is a scaling constant.

Sensor assembly 30 includes at least a sensor component 32 that includes a detection surface 42 with a geometric center point 44 thereon that is positioned in the vicinity of the mirror's focal point 50. As shown in FIG. 1, center point 44 is disposed at focal point 50. Surface 42 may be oriented at various angles α (formed between the normal to surface 42 and baseline 54 of the mirror) so that surface 42 faces at least a portion of mirror 20. In various embodiments sensor assembly 30 may also include a filter component 40 adjacent to or abutting sensor component 32. When a sensor assembly 30 including a filter component 40 is used in IR thermometer 10, filter component 40 may be disposed between sensor component 32 and mirror 20.

In various embodiments, mirror 20 is disposed inside thermometer 10 such that aperture 16 is in the line of sight of mirror 20. So disposed, mirror 20 may reflect radiation toward sensor assembly 30 that was emitted from a portion of an object 14 in the field of view of aperture 16 and passed through aperture 16 and protective window and/or filter 55.

Figure 2:
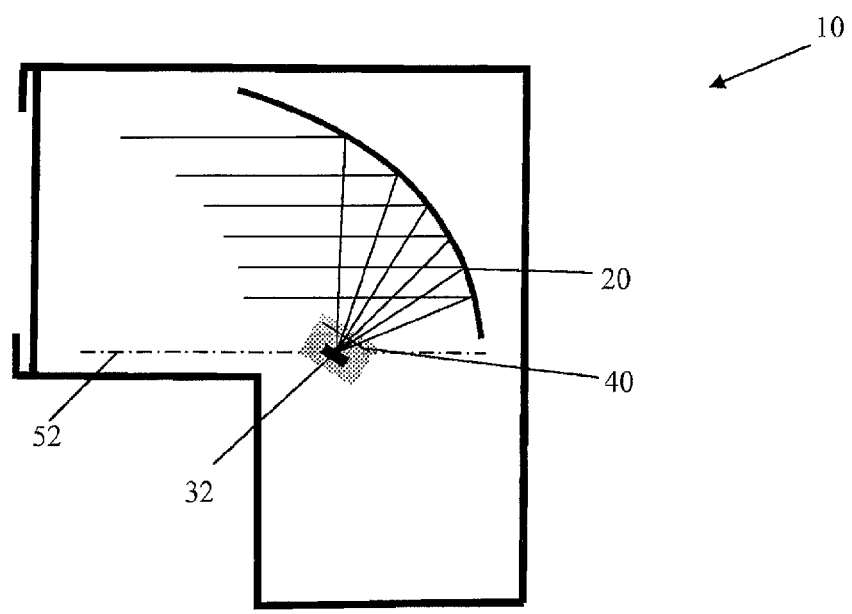
FIG. 2 is a cross-sectional view of an IR thermometer according to an embodiment of the present invention.
Figure 3:
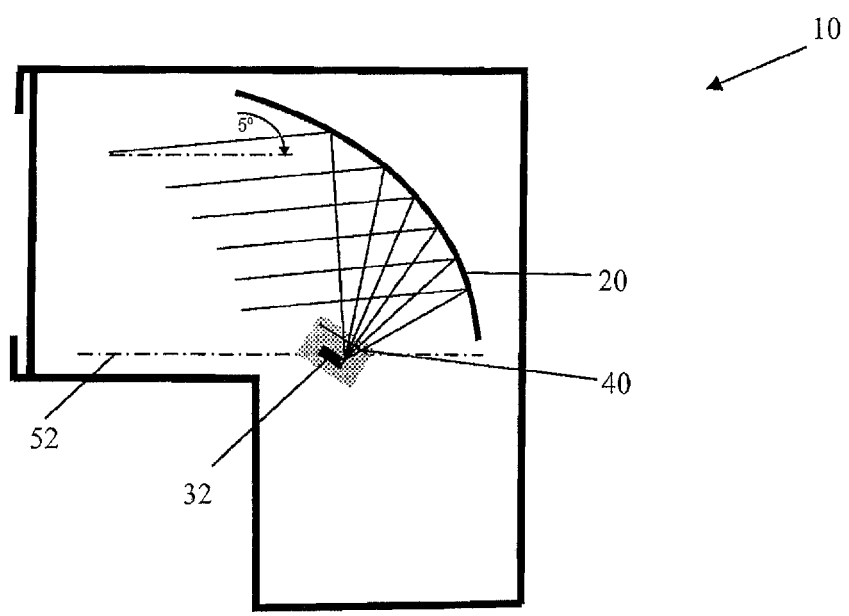
FIG. 3 is a cross-sectional view of an IR thermometer according to an embodiment of the present invention.
Figure 4:
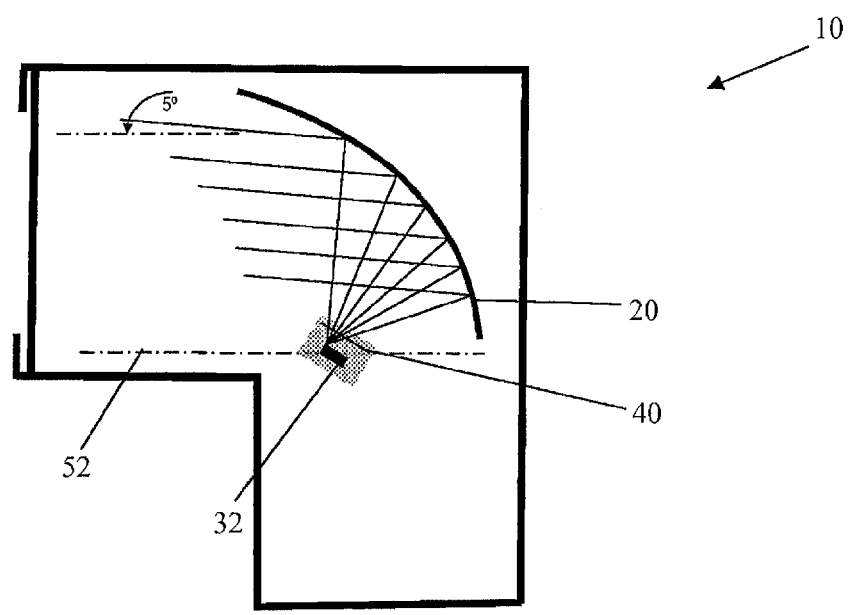
FIG. 4 is a cross-sectional view of an IR thermometer according to an embodiment of the present invention.
Figure 5:
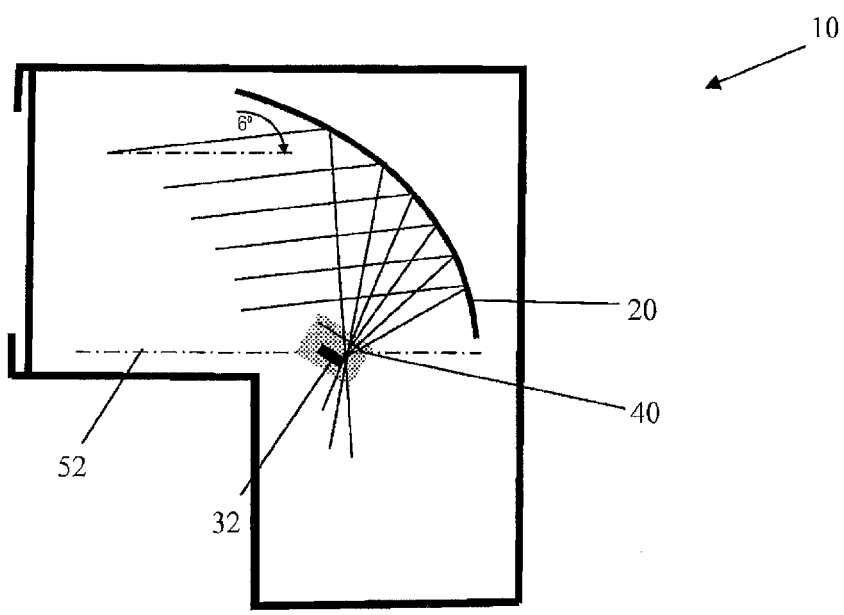
FIG. 5 is a cross-sectional view of an IR thermometer according to an embodiment of the present invention.
Figure 6:
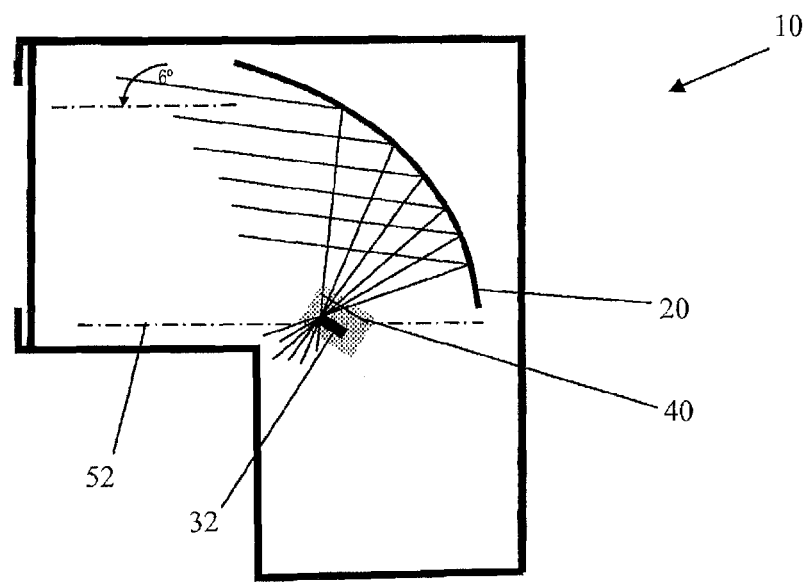
FIG. 6 is a cross-sectional view of an IR thermometer according to an embodiment of the present invention.
Figure 7:
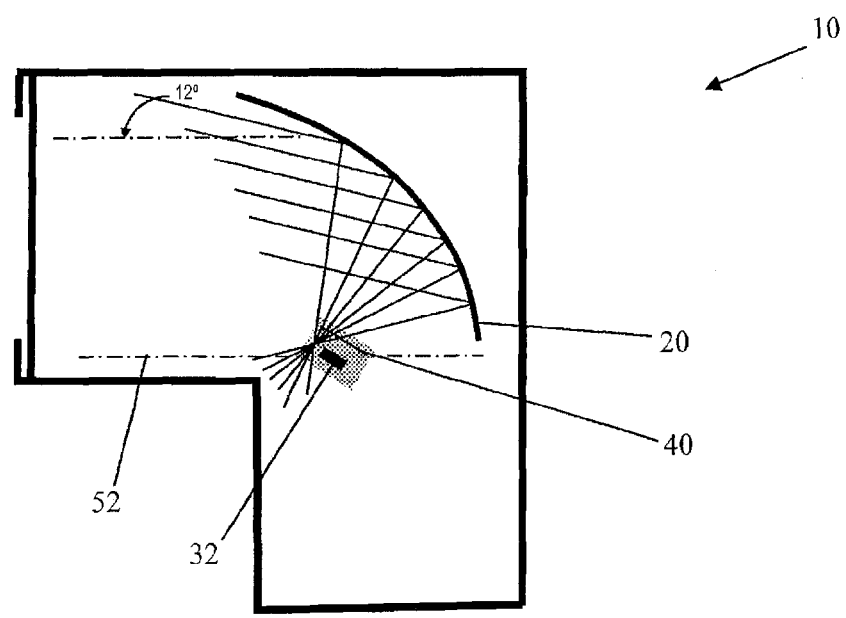
FIG. 7 is a cross-sectional view of an IR thermometer according to an embodiment of the present invention.

The amount of radiation incident upon mirror 20 that is directed onto surface 42, i.e., that the sensor can detect, is a function of the angle α. In various embodiments, including those embodiments where the mirror has parabolic shapes, curvatures, or surfaces, surface 42 may be oriented so that α is between approximately 25° and approximately 35°. In various embodiments, e.g., where the mirror has a parabolic shape defined by a being approximately 0.0799 and b being approximately −0.015, α may be set at approximately 31.5°. For these embodiments, sensor component 32 primarily receives radiation that approaches mirror 20 at a angles of less than approximately five degrees above or below a line parallel to axis of symmetry 52. Such a range of angles may be referred to as a radiation range of angles. Conversely, sensor component 32 receives only a minimal or negligible portion of the radiation that approaches mirror 20 at a radiation range of angles greater than approximately six degrees above or below a line parallel to the axis of symmetry 52 because, given the mirror's shape and the size of surface 42, radiation oriented at these larger angles is not reflected by the mirror along a path that intersects with or reaches surface 42. For illustration, FIG. 2 depicts radiation that is directed toward mirror 20 in a direction parallel to axis of symmetry 52. The mirror reflects most or all of this radiation, which then passes through filter component 40 to strike sensor surface 42 near to center point 44, FIG. 3 depicts radiation that is directed approximately five degrees above a line parallel to axis of symmetry 52. The mirror reflects this radiation, which then passes through filter component 40 to strike surface 42 near to the right edge of sensor component 32. FIG. 4 depicts radiation that is directed approximately five degrees below a line parallel to axis of symmetry 52. The mirror reflects this radiation, which then passes through filter component 40 to strike sensor surface 42 near to the left edge of sensor component 32. FIG. 5 depicts radiation that is directed approximately six degrees above a line parallel to axis of symmetry 52, and FIG. 6 depicts radiation that is directed approximately six degrees below a line parallel to axis of symmetry 52. In these latter two cases, the mirror reflects the radiation, which then passes through filter component 40; however, the reflected radiation does not strike sensor component 32, falling too far to the right (FIG. 5) or too far to the left (FIG. 6). FIG. 7 depicts radiation that is directed approximately 12 degrees below a line parallel to axis of symmetry 52, which more clearly show that the reflected radiation does not strike sensor component 32. Accordingly, by selectively positioning the mirror in these and other embodiments, undesired radiation that does not emanate from a portion of a surface disposed in front of aperture 16, such that this radiation is oriented outside of a desired radiation range of angles, may be diverted away from sensor component 32. Correspondingly, sensor component 32 does not detect this undesired radiation. However, sensor component 32 can detect desired radiation emanating from a portion of a surface disposed in front of aperture 16 because this radiation is oriented inside the desired radiation range of angles and reaches sensor component 32. In this way, stray radiation emanating from objects other than the intended object can be prevented from reaching the sensor and being detected.

In various embodiments, filter component 40 may be an infrared band-pass type filter made of silicon that allows radiation having wavelengths between approximately, e.g., 7.5 μm and 13.5 μm to reach surface 44. Such a filter prevents, e.g., visible light and far infrared light from reaching the sensor and affecting the sensor's output. Additionally, such a filter may be used to reduce the intensity of the radiation in the range of desired wavelengths, e.g., IR radiation, that reaches the sensor, which may improve the accuracy and the repeatability of the sensor. In certain embodiments, the intensity of the radiation passing the filter and reaching the sensor is one-seventh of the radiation that reflects from the mirror and reaches the filter. A non-limiting example of a sensor that may be used in various embodiments described herein is Part No. TPiS 1T 1252, manufactured by Excelitas Technologies Corp.

While the various embodiments of the invention have been particularly shown and described, it will be understood by those skilled in the art that various changes in form and details may be made therein without departing from the spirit and scope of the invention. Accordingly, these embodiments are non-limiting examples of the invention and the invention should be understood to be defined only by the scope of the claims and their equivalents.

The invention claimed is:
1. A medical thermometer, comprising:
a housing having a radiation entrance;
a mirror disposed in the housing, a reflective surface of the mirror having a parabolic shape defining a vertex, a baseline tangent to the parabolic shape at the vertex, an axis of symmetry perpendicular to both the baseline and to the radiation entrance, and a focal point; and
a radiation sensor having a detection surface, the radiation sensor disposed in the housing at the focal point such that a normal to the detection surface is angled from 25° to 35° with respect to the baseline of the reflective surface,
wherein, the radiation entrance, the mirror and the radiation sensor are configured for the detection surface to receive radiation passing through the radiation entrance from 5° to −5° of a line parallel to the axis of symmetry, and for the mirror to reflect away from the detection surface radiation passing through the radiation entrance not within 6° and −6° of a line parallel to the axis of symmetry.

2. The medical thermometer of claim 1 wherein the parabolic shape is defined by the equation $y=ax^2+bx+c$, where a is not equal to 0.

3. The medical thermometer of claim 2 wherein a is from 0.01 to 2.0.

4. The medical thermometer of claim 2 wherein b is from −2.0 to 2.0.

5. The medical thermometer of claim 1 wherein the detection surface has a center point thereon and the center point is disposed approximately at the focal point.

6. The medical thermometer of claim 2 wherein a is from 0.07 to 0.09.

7. The medical thermometer of claim 6 wherein b is from −0.02 to −0.01.

8. The medical thermometer of claim 7 wherein the detection surface has a center point thereon and the center point is disposed approximately at the focal point.

9. The medical thermometer of claim 8 wherein the normal to the detection surface is angled from 31° to 32° with respect to the baseline.

10. The medical thermometer of claim 1, further comprising a filter positioned in the field of view of the radiation sensor and between the mirror and the radiation sensor, the filter being capable of passing only radiation having a predetermined range of wavelengths.

11. The medical thermometer of claim 10, wherein the filter is capable of passing only radiation having wavelengths from 7.5 µm to 13.5 µm.

12. The medical thermometer of claim 10, wherein the filter is a component of a radiation sensor assembly which includes the radiation sensor.

13. A medical thermometer, comprising:
a housing having a radiation entrance;
a parabolic mirror having a vertex, a focal region, a baseline tangent to the mirror at the vertex and an axis of symmetry perpendicular to both the baseline and to the radiation entrance; and
a radiation sensor having a center point on a detection surface, the center point being disposed at least approximately at the focal region, and a normal to the detection surface being oriented at a detection angle with respect to the baseline, the detection angle being from 25° to 35°,
wherein, the radiation entrance, the mirror and the radiation sensor are configured for the detection surface to receive radiation passing through the radiation entrance from 5° to −5° of a line parallel to the axis of symmetry, and for the mirror to reflect away from the detection surface radiation passing through the radiation entrance not within 6° and −6° of a line parallel to the axis of symmetry.

14. The medical thermometer of claim 13 wherein the parabolic mirror has a shape defined by the equation $y=ax^2+bx+c$, where a is not equal to 0, and further wherein the focal region is a focal point, and the parabolic shape a parabola vertex coincident with the vertex of the mirror.

15. The medical thermometer of claim 14 wherein a is from 0.01 to 2.0.

16. The medical thermometer of claim 14 wherein b is from −2.0 to 2.0.

17. The medical thermometer of claim 14 wherein a is from 0.07 to 0.09.

18. The medical thermometer of claim 17 wherein b is from −0.02 to −0.01.

19. The medical thermometer of claim 18 wherein the detection angle is from 31° to 32°.

20. The medical thermometer of claim 13, further comprising a filter positioned in the field of view of the radiation sensor and between the mirror and the radiation sensor, the filter being capable of passing only radiation having a predetermined range of wavelengths.

21. The medical thermometer of claim 20, wherein the filter is capable of passing only radiation having wavelengths from 7.5 µm to 13.5 µm.

22. The medical thermometer of claim 20, wherein the filter is a component of a radiation sensor assembly which includes the radiation sensor.

23. A medical thermometer, comprising:
a housing having a radiation entrance;
a parabolic mirror defined by the equation $y=ax^2+bx+c$, where a is from 0.07 to 0.09, b is from −0.02 and −0.01, the parabolic mirror having an axis of symmetry, a vertex, a baseline tangent to the mirror at the vertex, the axis of symmetry perpendicular to both the baseline and to the radiation entrance, and a focal point; and
a radiation sensor having a center point on a detection surface, the center point being disposed at the focal point, and a normal to the detection surface being oriented from 30° to 33° with respect to the baseline;
wherein, the mirror and the radiation sensor are configured for the detection surface to receive radiation passing through the radiation entrance from 5° to −5° of a line parallel to the axis of symmetry, and for the mirror to reflect away from the detection surface radiation passing through the radiation entrance not within 6° and −6° of a line parallel to the axis of symmetry.

24. A method of using a medical thermometer including a housing having a radiation entrance, a parabolic mirror disposed in the housing, the parabolic mirror having a vertex, a baseline tangent to the mirror at the vertex, and an axis of symmetry perpendicular to both the baseline and to the radiation entrance, and a radiation sensor having a detection surface, a normal to the detection surface being oriented between 30° and 33° with respect to the baseline, comprising;
disposing the thermometer relative to a target; and
directing the radiation entrance toward the target,
receiving a temperature value determined from radiation that passes through the radiation entrance from 5° to −5° of a line parallel to the axis of symmetry received by the detection surface, while radiation that passes through the radiation entrance not within 6° and −6° of the line parallel to the axis is reflected away from the detection surface by the mirror.

25. The method of claim 24 wherein the mirror has a parabolic shape as defined by the equation $y=ax^2+bx+c$, where a is not equal to 0, the parabolic shape having a focal point, a vertex, and an axis of symmetry collinear with the axis of the mirror.

26. The method of claim 25 wherein a is from 0.07 to 0.09.

27. The method of claim 26 wherein b is from −0.02 to −0.01.

28. The method of claim 24 wherein the detection surface has a center point thereon and wherein the center point is disposed approximately at the focal point.

* * * * *